United States Patent [19]

Samworth

[11] Patent Number: 6,118,935
[45] Date of Patent: Sep. 12, 2000

[54] DIGITAL HALFTONING COMBINING MULTIPLE SCREENS WITHIN A SINGLE IMAGE

[75] Inventor: Mark R. Samworth, Wilmington, Del.

[73] Assignee: Professional Software Technologies, Inc., Bristol, Pa.

[21] Appl. No.: 08/845,637

[22] Filed: Apr. 1, 1997

[51] Int. Cl.[7] ..................................................... H04N 1/40
[52] U.S. Cl. .......................... 395/109; 358/456; 382/237
[58] Field of Search ............................. 395/109; 358/455, 358/456, 457, 534, 535, 536; 382/237

[56] References Cited

U.S. PATENT DOCUMENTS 4,866,534  9/1989  Tada ........................................ 358/456
5,802,212  9/1998  Shu et al. ................................. 382/237

Primary Examiner—Thomas D. Lee
Attorney, Agent, or Firm—John J. Simkanich

[57] ABSTRACT

An apparatus and method of producing enhanced digital imaging for printing data, in flexographic and other types of printing environments, combines halftone screens which represent continuous "gray tone" (grey tone) levels, wherein the transition from one screen to the other is not visually detectable by an observer of the reproduction results. The digital processing method includes combining an (FM generated) dispersed dot screen with an (AM generated) cluster dot screen, with an overlay interval of both screens of acceptable resultant dot size (percent coverage), to obtain enhanced overall definition over the grey scale range of 1 to 100 percent (i.e., where 100 is equal to "255" in 8-bit environment), specifically over the more visually perceptive gray scale range of 1 to 20 (i.e., out of 0–255 value). The apparatus which implements the method algorithm is positioned intermediate a desktop publishing system and an image setter.

11 Claims, 12 Drawing Sheets

(GRAY SCALE RANGE—DIGITAL VALUES)
11111111=255
0=00000000

FIG. 8A

|  | Front Screen (23) | Back Screen (25) |
|---|---|---|
| Start Point: | 0 | 5 |
| End Point: | 20 | 255 |
| Transition Step: | 0 | 0 |
| Minimum Dot: | 0 | 0 |
| First Dot: | 0 | 0 |

| initial grey value | Front Screen (23) | Back Screen (25) | sum |
|---|---|---|---|
| 0 | 0.00 | 0.00 | 0.00 |
| 1 | 1.00 | 0.00 | 1.00 |
| 2 | 2.00 | 0.00 | 2.00 |
| 3 | 3.00 | 0.00 | 3.00 |
| 4 | 4.00 | 0.00 | 4.00 |
| 5 | 5.00 | 0.00 | 5.00 |
| 6 | 4.67 | 1.33 | 6.00 |
| 7 | 4.33 | 2.67 | 7.00 |
| 8 | 4.00 | 4.00 | 8.00 |
| 9 | 3.67 | 5.33 | 9.00 |
| 10 | 3.33 | 6.67 | 10.00 |
| 11 | 3.00 | 8.00 | 11.00 |
| 12 | 2.67 | 9.33 | 12.00 |
| 13 | 2.33 | 10.67 | 13.00 |
| 14 | 2.00 | 12.00 | 14.00 |
| 15 | 1.67 | 13.33 | 15.00 |
| 16 | 1.33 | 14.67 | 16.00 |
| 17 | 1.00 | 16.00 | 17.00 |
| 18 | 0.67 | 17.33 | 18.00 |
| 19 | 0.33 | 18.67 | 19.00 |
| 20 | 0.00 | 20.00 | 20.00 |
| 21 | 0.00 | 21.00 | 21.00 |
| 22 | 0.00 | 22.00 | 22.00 |
| 23 | 0.00 | 23.00 | 23.00 |
| 24 | 0.00 | 24.00 | 24.00 |
| 25 | 0.00 | 25.00 | 25.00 |
| 26 | 0.00 | 26.00 | 26.00 |
| 27 | 0.00 | 27.00 | 27.00 |
| 28 | 0.00 | 28.00 | 28.00 |
| 29 | 0.00 | 29.00 | 29.00 |
| 30 | 0.00 | 30.00 | 30.00 |
| 31 | 0.00 | 31.00 | 31.00 |
| 32 | 0.00 | 32.00 | 32.00 |
| 33 | 0.00 | 33.00 | 33.00 |
| 34 | 0.00 | 34.00 | 34.00 |
| 35 | 0.00 | 35.00 | 35.00 |
| 36 | 0.00 | 36.00 | 36.00 |
| 37 | 0.00 | 37.00 | 37.00 |
| 38 | 0.00 | 38.00 | 38.00 |
| 39 | 0.00 | 39.00 | 39.00 |
| 40 | 0.00 | 40.00 | 40.00 |

FIG. 9A

|  | Front Screen (23) | Back Screen (25) |
|---|---|---|
| Start Point: | 0 | 5 |
| End Point: | 20 | 255 |
| Transition Step: | 3 | 0 |
| Minimum Dot: | 0 | 0 |
| First Dot: | 0 | 0 |

| initial grey value | Front Screen | Back Screen | sum |
|---|---|---|---|
| 0 | 0.00 | 0.00 | 0.00 |
| 1 | 1.00 | 0.00 | 1.00 |
| 2 | 2.00 | 0.00 | 2.00 |
| 3 | 3.00 | 0.00 | 3.00 |
| 4 | 4.00 | 0.00 | 4.00 |
| 5 | 2.00 | 0.00 | 2.00 |
| 6 | 1.87 | 1.33 | 3.20 |
| 7 | 1.73 | 2.67 | 4.40 |
| 8 | 1.60 | 4.00 | 5.60 |
| 9 | 1.47 | 5.33 | 6.80 |
| 10 | 1.33 | 6.67 | 8.00 |
| 11 | 1.20 | 8.00 | 9.20 |
| 12 | 1.07 | 9.33 | 10.40 |
| 13 | 0.93 | 10.67 | 11.60 |
| 14 | 0.80 | 12.00 | 12.80 |
| 15 | 0.67 | 13.33 | 14.00 |
| 16 | 0.53 | 14.67 | 15.20 |
| 17 | 0.40 | 16.00 | 16.40 |
| 18 | 0.27 | 17.33 | 17.60 |
| 19 | 0.13 | 18.67 | 18.80 |
| 20 | 0.00 | 20.00 | 20.00 |
| 21 | 0.00 | 21.00 | 21.00 |
| 22 | 0.00 | 22.00 | 22.00 |
| 23 | 0.00 | 23.00 | 23.00 |
| 24 | 0.00 | 24.00 | 24.00 |
| 25 | 0.00 | 25.00 | 25.00 |
| 26 | 0.00 | 26.00 | 26.00 |
| 27 | 0.00 | 27.00 | 27.00 |
| 28 | 0.00 | 28.00 | 28.00 |
| 29 | 0.00 | 29.00 | 29.00 |
| 30 | 0.00 | 30.00 | 30.00 |
| 31 | 0.00 | 31.00 | 31.00 |
| 32 | 0.00 | 32.00 | 32.00 |
| 33 | 0.00 | 33.00 | 33.00 |
| 34 | 0.00 | 34.00 | 34.00 |
| 35 | 0.00 | 35.00 | 35.00 |
| 36 | 0.00 | 36.00 | 36.00 |
| 37 | 0.00 | 37.00 | 37.00 |
| 38 | 0.00 | 38.00 | 38.00 |
| 39 | 0.00 | 39.00 | 39.00 |
| 40 | 0.00 | 40.00 | 40.00 |

DIGITAL HALFTONING COMBINING MULTIPLE SCREENS WITHIN A SINGLE IMAGE

BACKGROUND OF THE INVENTION

The present invention is directed to the field of image processing as predicate to driving a printing machine, such as an image setter which images films or plates to printed on a flexopress (a flexographic printer), and to the use of halftone image screens to produce enhanced desktop publishing image data.

Halftoning is a computer graphics technique for displaying an image, with many gray levels, on a binary imaging device in which the gray levels are approximated by variable-sized black and white dots. The image presentation is achieved by changing dot percentage of area coverage (intensity) from region to region.

A gray code, in computer mathematics, is a binary code in which sequential numbers are represented by binary expressions, each sequential one of which differs from the preceding by one place, only. Gray level is the value associated with a pixel in a digital image, representing the brightness of the original scene in the vicinity of the point represented by the pixel. This translates to a direct relationship to dot size or percent area covered. Gray scale is an optical pattern in discrete steps between light and dark bearing on resolution.

In digital imaging, a desktop publishing computer performs gray scale manipulation on the data input into such computer from an image source such as a digital camera. Gray scale manipulation has become an image enhancement technique in which the appearance of a digital image is improved by applying a point operator to each pixel in the image, thereby adjusting its gray level.

This gray level adjustment has been performed by various methods. Previously, halftone imaging has been used to produce high resolution halftone images by iterative multi-level, multi-resolution error pyramidal convergence processes. See Peli, U.S. Pat. No. 5,109,282.

Halftone frequency modulated color separations have been produced from continuous-tone multicolored artefacts. In such a method, the dot patterns of the different tone levels are different for each individual color separation, but are connected with each other through criteria specifying an overlapping dot ratio in conjunction with a translation prohibition, thereby substantially suppressing moire, disturbing effects of misregister (e.g. color shifts) and graininess that is often seen in highlights and midtones of reproductions with stochastic distribution of halftone dots. See Kienlin, et al., U.S. Pat. No. 5,548,407.

Others have attempted to generate enhanced halftone imaging by using blue noise masks, or by dither matrixing techniques, or by incorporating special filters, or by dispersed dot screening, or by cluster dot screening. Many of these techniques utilize analog algorithms.

With the increased use of desktop publishing, digital computers have provided the ability to development digital halftoning techniques which employ digital image processing to produce halftone output images from a continuous tone input image. Color images can be created by combining gray scale values of a number of selected component colors. Typical component colors, selected for hard copy print operations, may be cyan, magenta, yellow and black (CMYK). In such a system, an individual component color, such as cyan is represented within the digital environment of a computer by a series of gray values ranging from 0 to 255. A CMYK image can be generated through the combination of four gray scale images, one for each component color (CMYK).

However, as the colors (CMYK) are used to make composite color results, gray scale enhancement for such a screening application is relevant to the individual gray scale values (0 to 255), and independent of the resultant color crated by a combination. It makes no difference if such screening is conducted in an application of black dots (patterns) on a white background, or a pattern of one, or a combination of more than one, of the component colors on a white background.

In digital halftone processing, each continuous tone gray value is converted into a binary halftone pattern. While many pattern styles are available, a dispersed dot pattern (FM screening) or a cluster dot pattern (AM screening) have been commonly utilized. Dispersed dot patterns are created by using a variety of error diffusion techniques (stochastic generators) which provide a randomized grain effect pattern. The size of the halftone dot, whose shape can vary from screen format to screen format, is fixed for a given screen.

Cluster dot patterns are generated by selecting a frequency or distance between halftone dots for the particular screen. Different gray values are achieved by varying the frequency of the dots.

A computerized imaging enhancement process will include some sort of pattern generator, the format for which will define a screen. Regardless of screen pattern selected, as pattern intensity is increased (percentage of area covered), image darkness an thereby resolution changes. With digital formats and digital implementation, and increase in gray value (number) results in an increased percent coverage.

These prior image enhancing methods have had various disadvantages. The analog methods have provided good quality tone continuity and change, but when processed in a digital environment, can introduce image discontinuities, and introduce processing delays encountered in translating between the analog and digital states. Iterative methods provide smooth transitions and constant repetitive gray scale values, but are slower computational processes. Filtering and masking can introduce approximations which in themselves can introduce imaging errors.

Both FM screening and AM screening have been implemented in a digital processing environment. However, FM screening (dispersed dot screening patterns) provides good imaging only at low gray values, but poor imaging (i.e., grainy effect) at higher gray values. AM screening (cluster dot screening patterns, which are usually round, or square or elliptical—on an exclusive basis) provides good imaging at high gray values, but irregular imaging at low gray values. Moreover, if one were to supplement the use of FM screening at low gray values with the use of AM screening at high gray values, the resultant image would have obvious transition point which would be objectionable to an observer. Patterns and the resolution obtained with each at various gray values.

What is desired is an improved digital imaging technique which provides enhanced digital imaging over the entire range of gray scale values, and which thereby minimizes or eliminates visible transition points.

What is also desired is an algorithm for implementing the digital technique which can reduce the computational requirements and the resultant processing times in relation to other imaging techniques.

What is further desired is an apparatus to provide such enhanced digital imaging and for the implementation of the algorithm of enhanced digital imaging process.

SUMMARY OF THE INVENTION

The objectives of the present invention are realized in a digital processor implemented structure which operates upon image data received from a desktop publishing computer to provide enhanced digital image data to an image setter unit of a press system. The image data is processed in accordance with an algorithm which first independently generates an FM dispersed dot screen "component" of the image (i.e., a first screened image component) and independently generates an AM cluster dot image "component" (i.e., a second screened image component). Then the two binary screened images are combined to form a third screened image (the invention output).

This combination is derived using digital pixel calculation, which generates a printable pixel for the third or composite image, by multiplying the pixel value from the first screen by the respective pixel value from the second screen. This operation generates a printable pixel image for the third screen (i.e., the output image) in the presence of a pixel at that position on either the first or second screened image (components).

The FM dispersed dot screen generation is limited to the light areas (lower gray values) of dispersed dot screen gray scale values. The AM cluster dot screen generation is limited to the darker areas (higher gray values) of cluster dot screen gray scale values. This limiting of the respective screen ranges creates a naturally occurring gray scale range where the two screens overlap.

The resultant dot size (percentage of coverage which is inversely related to density) and resolution of the third screen is controlled by a gray value compensation algorithm which assures that the composite (third screen) dot size has been linearly implemented over the gray tone scale. This compensation algorithm creates an individual compensation curve for each of the first and second screens by gray scale value, whereby the sum of the two curves is a straight inclined line. This minimizes or eliminates visual transition points in the screen overlap region. By adjusting the curve for the first and the second screens, the character of resultant image blend can be changed. Therefore, a harsh demarcation line in this transition zone is even further minimized or visually eliminated.

DESCRIPTION OF THE DRAWINGS

The features, advantages and operation of the present invention will become readily apparent and further understood from a reading of the following detailed description with the accompanying drawings, in which like numerals refer to like elements, and in which:

FIG. 8a is a list of screen values for each of the first and second screens, including the compensated composite sum of the screen values (third screen), as listed against the grey value scale.

FIGS. 9a, 9b, 9c and 9d show the same types of information described above with respect to FIGS. 8a, 8b, 8c and 8d, except that the first screen curve (FIG. 9b) and the composite (third) screen curve have a negative off-set at about gray scale value 5, further muting the transition between the dispersed and cluster dot patterns;

DETAILED DESCRIPTION OF THE INVENTION

The present invention is a method of digital imaging by gray tone to halftone generation and thereafter by halftone processing which produces an enhanced digitally generated image output. The invention also includes the apparatus for implementing this digital halftone processing. The apparatus is connectable between the output of a desktop publishing computer and the input of an image setter which images films or plates to be printed on a flexo-press. A preview screen may be included to view press output prior to runs.

In the halftoning process, gray tone information is converted into halftone information which is independently further processed. At some time thereafter the halftone information is recombined. Each continuous tone (pixel by pixel) gray value is converted into a binary halftone pattern or screen. This segment of the process is implemented by known methods.

Figure 1:
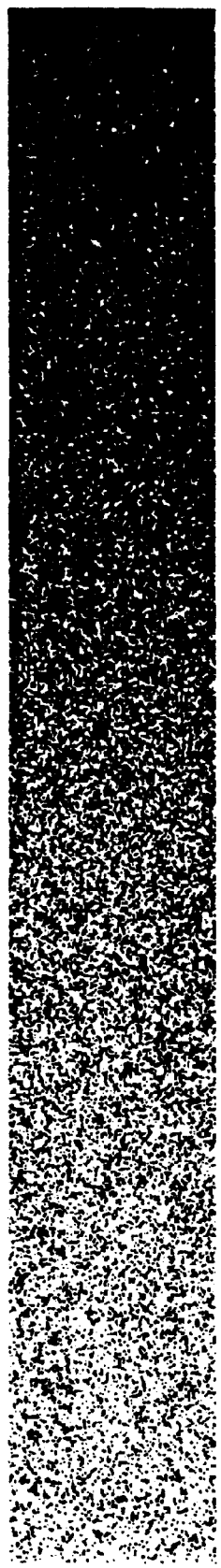
FIG. 1 shows a template for an FM dispersed dot screen for a range of gray scale values of 0–255 reading left to right.
Figure 1:
Figure 2:
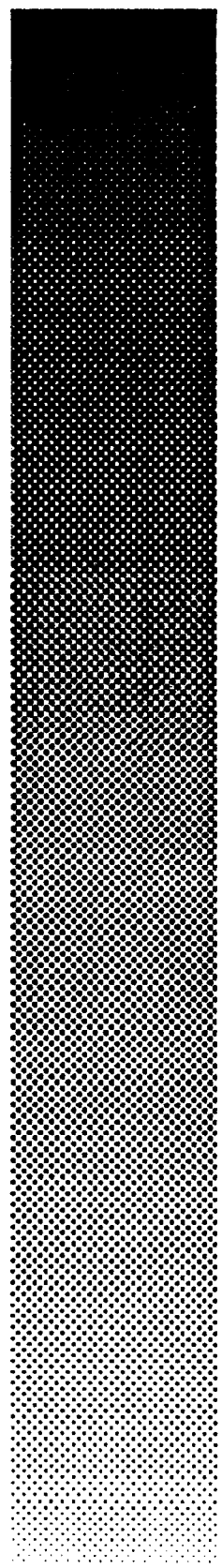
FIG. 2 shows a template for an AM cluster dot screen for a range of gray scale values of 0–255 reading left to right.

While a multitude of halftone pattern styles (screens) may be selected from, two patterns have provided the most visually desirable images. These are the FM generated, dispersed dot screen, FIG. 1, and the AM generated, cluster dot screen, FIG. 2. Each of these screens, FIG. 1 and FIG. 2, are shown for the range of gray scale values of intensity, i.e., dot size as equated to percentage of coverage. The lower gray values are at the left of these FIGS. 1 and 2.

With the dispersed dot pattern, FIG. 1, the size of the halftone dot is fixed for a given screen. Different gray levels are achieved by varying the frequency of the dots. Therefore, dispersed dot screening is referred to as frequency modulation. There are limitations, however, true frequency modulation. Stochastic number generation is utilized to generate the dispersed dot patterns, via error diffusion techniques, which results in randomized grain effect, especially at high gray values. High quality imaging is impacted by the use solely of dispersed dot screening. Dispersed dot FM screening produces generally unacceptable imaging above gray values of about 20.

With cluster dot patterning, the frequency or distance between halftone dots is fixed for a given screen. Different gray values are achieved by varying the size of the halftone dot. Thus this screening is known as amplitude modulated (AM) screening. Typically, screen frequencies found suitable in digital image processing are between 50 and 200 dots per inch. With these dot frequencies, cluster dot AM screening produces generally unacceptable imaging below gray values of about 5.

Thus in imaging for some printing processes, such as flexography, dispersed dot screening is significantly superior in the reproduction of lighter gray levels, while cluster dot screening is superior in the reproduction of darker gray levels.

For flexographic printing, a 150 line cluster dot screen may be significantly superior to any dispersed dot screen for the reproduction of gray levels between 5 and 255. This superiority would manifest itself in producing a less grainy appearance and having less dot gain printing when compared to any dispersed dot screen. For the same flexographic printing operation, a 30 micro FM dispersed dot screen may provide superior imaging for the reproduction of gray levels between 0 and 5. This superiority would manifest itself in less dot gain printing and in preserving detail in highlight area.

Figure 3:
FIG. 3 shows a test image digitally generated solely with a dispersed dot screening technique.

An (test) image digitally generated, solely, with dispersed dot screening, FIG. 3, demonstrates how dispersed dot screening, FIG. 1, produces enhanced light gray level printing in flexography, FIG. 3. The "flexo highlight break" is eliminated. This flexo highlight break is a visually noticeable transition point between the paper and the first printing dot found in cluster dot printing, i.e., the screen pattern of FIG. 2. Dispersed dot screening enables accurate reproduction of low grey levels.

The graininess produced by dispersed dot screening at darker gray levels (higher gray values), is quite evident in FIG. 3. This graininess distracts from the composition of the printed image, FIG. 3.

Figure 4:
FIG. 4 shows the test image digitally generated solely with a cluster dot screening technique.

The same (test) image digitally generated, solely, with cluster dot screening, FIG. 4, demonstrates the advantages of cluster dot screening at higher gray values (darker gray levels). It also demonstrates flexo highlight break effects on imaging which are evident at lower gray values (lighter gray levels).

Figure 5:
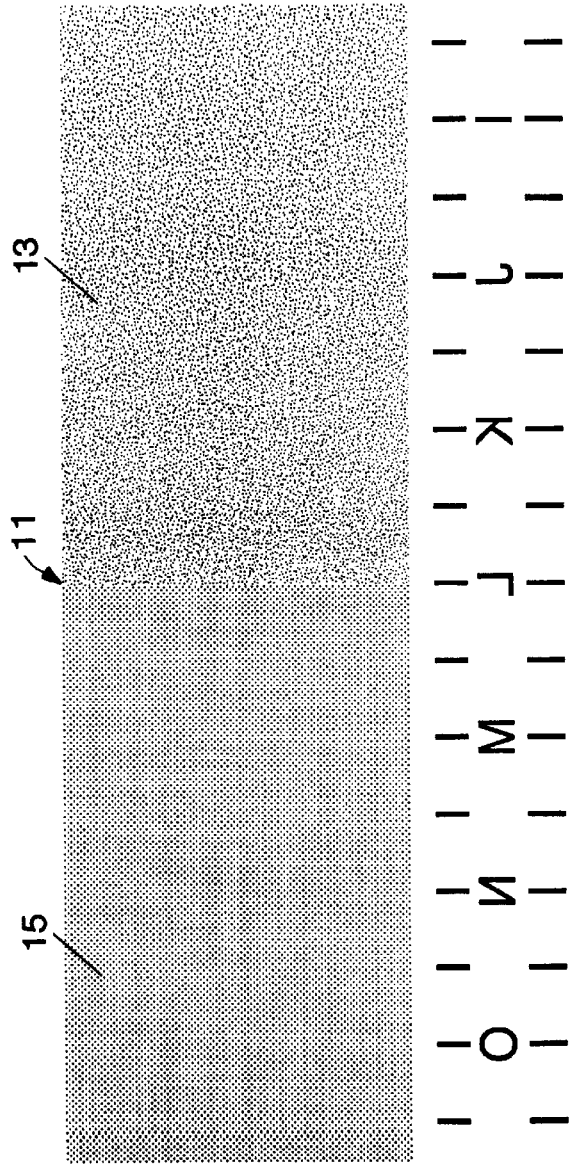
FIG. 5 shows an enlarged view of a digital dot pattern merger by the abutment of a dispersed dot screen pattern (right side) and a cluster dot pattern (left side), at a gray scale value where image quality is acceptable for each of the two screens.

If both dispersed and cluster dot screening techniques were used, with a transition at some gray value between 5 and 20, e.g., nominally at 10, a visually noticeable transition point, 11, FIG. 5, in the image would occur between the dispersed dot region 13, and the cluster dot region 15.

Figure 6:
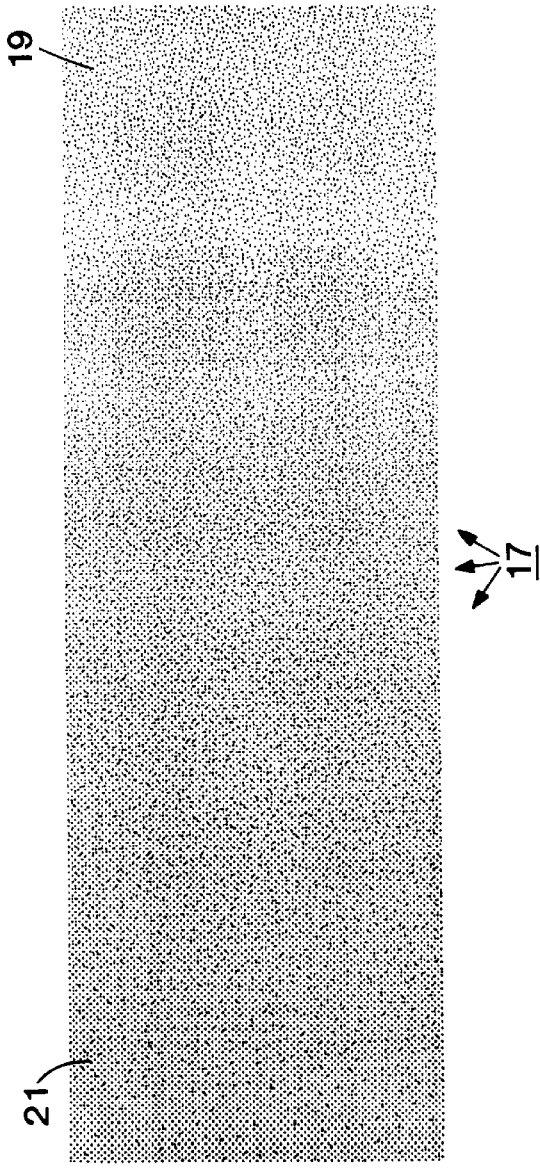
FIG. 6 shows an enlarged view of the composite screen merged according to the present invention, at a gray scale value where image quality is acceptable for each of the two screens, this merger being a gradual blend from a dispersed dot screen pattern (right side) and a cluster dot pattern (left side)

However, if the transition 17, FIG. 6, from a dispersed dot region 19, to a cluster dot region 21, were made more gradual, the transition point, of FIG. 5, would be minimized or eliminated, FIG. 6.

The process digitally merges the individual image components, produced from dispersed dot and from cluster dot screening, gradually over a range of gray levels, FIG. 6, instead of changing abruptly from one screen to another at a single gray level, FIG. 5.

Figure 7:
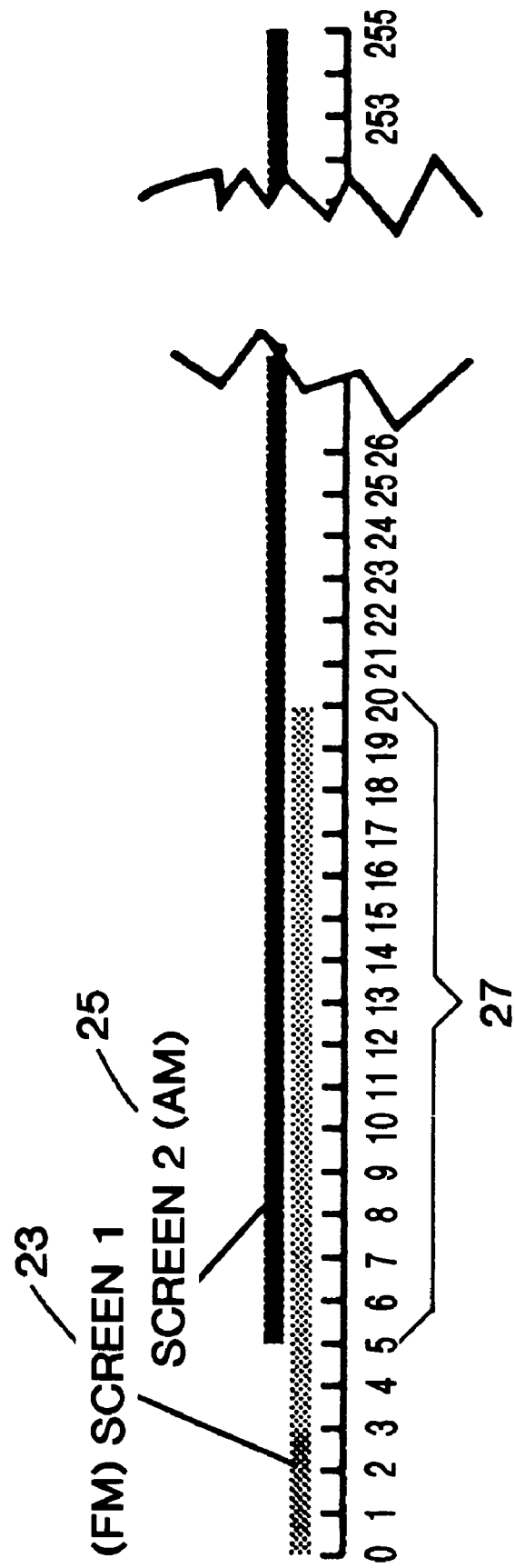
FIG. 7 shows a plot of the region of respective first and second dot screen patterns and the region of overlap, as plotted against gray scale values.

The point, i.e. gray value, at which first screen 23 (the front or dispersed dot—FM generated screen) ends, FIG. 7, will be at a higher gray level than the point at which the second screen 25 (the back or cluster dot—AM generated screen) begins. In digital halftoning, FIG. 7, this overlap can nominally exist between gray level values 5 and 20, range 27, for the digital halftoning of FM screen 1 (front screen generated from dispersed dot pattern) 23, and AM screen 2 (back screen generated from cluster dot pattern) 25.

For gray levels represented by a single screen, the dot size is directly associated with gray level. For example, a gray level of 50 percent will be assigned a dot pattern of 50 percent coverage.

For digital halftoning gray levels represented by a combination of screens, the dot sizes of the respective individual screens is reduced so that the combination of the two screen dot sizes will equal the initial (or composite) gray level. This is individual screen compensation in halftone combining and is demonstrated in FIG. 8a, which is a list of screen values for the front screen 23 and back screen 25 of FIG. 7, for the range 27 of overlapping screen values of FIG. 7.

Figure 8B:
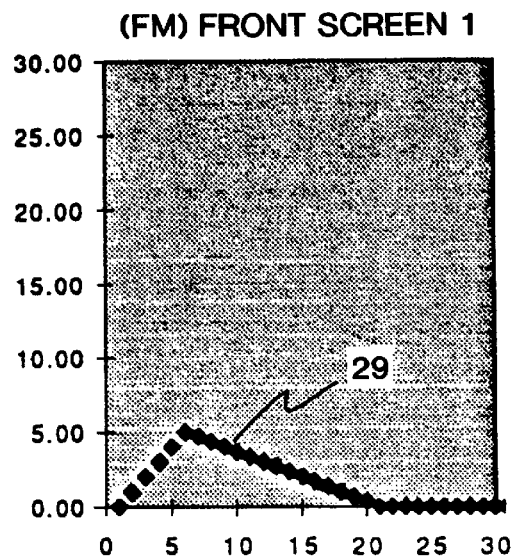
FIG. 8b shows a plot of a compensation curve for the first screen over a range of gray scale values of interest.
Figure 8C:
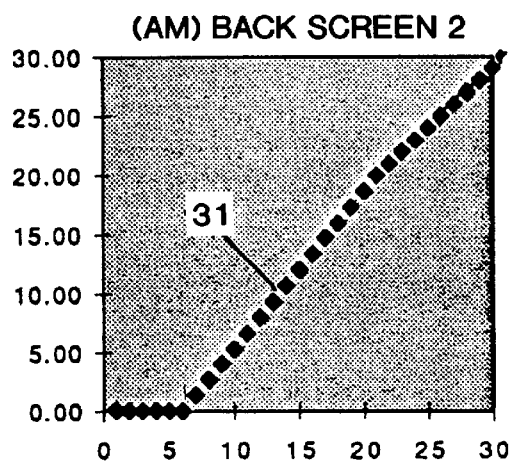
FIG. 8c shows a plot of a compensation curve for the second screen over the same range of gray scale values as FIG. 8b.

If the front screen 23 values are plotted, a first compensation gray value curve 29, FIG. 8b is created. If the back screen 25 values are plotted, a second compensation gray value curve 31 is created, FIG. 8c. The sum of the gray values 29 and 31 creates a third screen composite gray value curve 33, FIG. 8d, for the output image.

The curves 29 and 31 can be generated an of a number of appropriate software programs, which can vary the resultant output image with a variation of the algorithm implemented in the software program. The programming variations in the software will be dependant upon the type of printing system being driven.

TABLE A is a listing, in MICROSOFT VISUAL BASIC, of a software program for generating the curves 29 and 31 for a flexographic printing system.

Figure 9B:
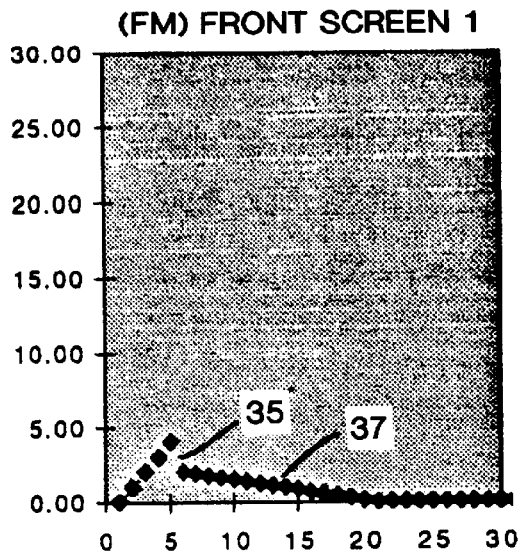

It has been found that the gradual transition between dispersed and cluster dot screens, which crates the visual impact of highlight break, can be further softened by introducing a step function, off-set 35, FIG. 9b, in the front screen (FM dispersed dot) compensation curve 37, FIG. 9b. This lowers each of the gray values at gray scale levels above the off-set 37, when compared with the original compensation curve 29, FIG. 8b.

Figure 9C:
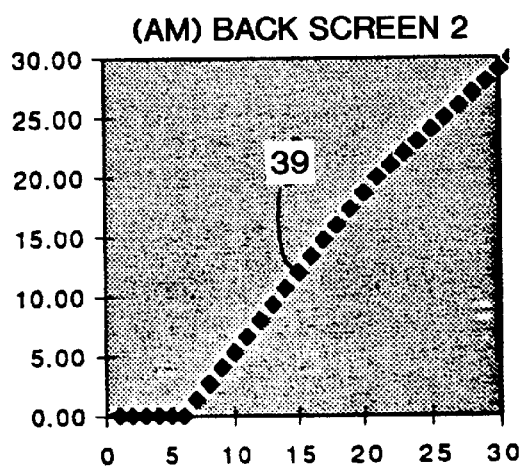
Figure 9D:
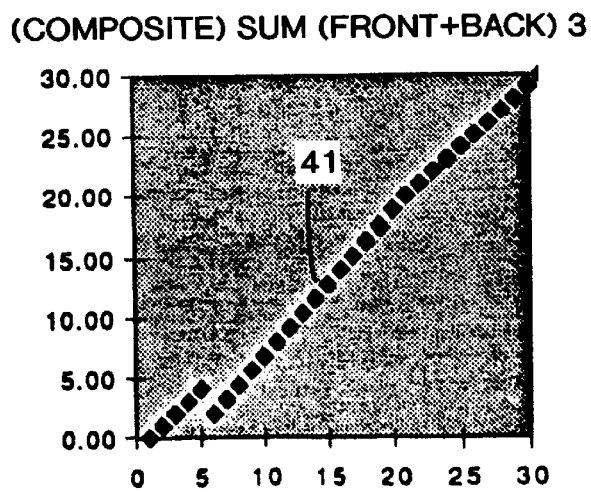

FIG. 9 shows the chart of individual component screen curve values for the off-set front screen 23 compensation curve 37, the back screen 25 compensation curve 39, and the composite output values 41. These values are plotted in FIGS. 9b, 9c and 9d, respectively.

Figure 10A:
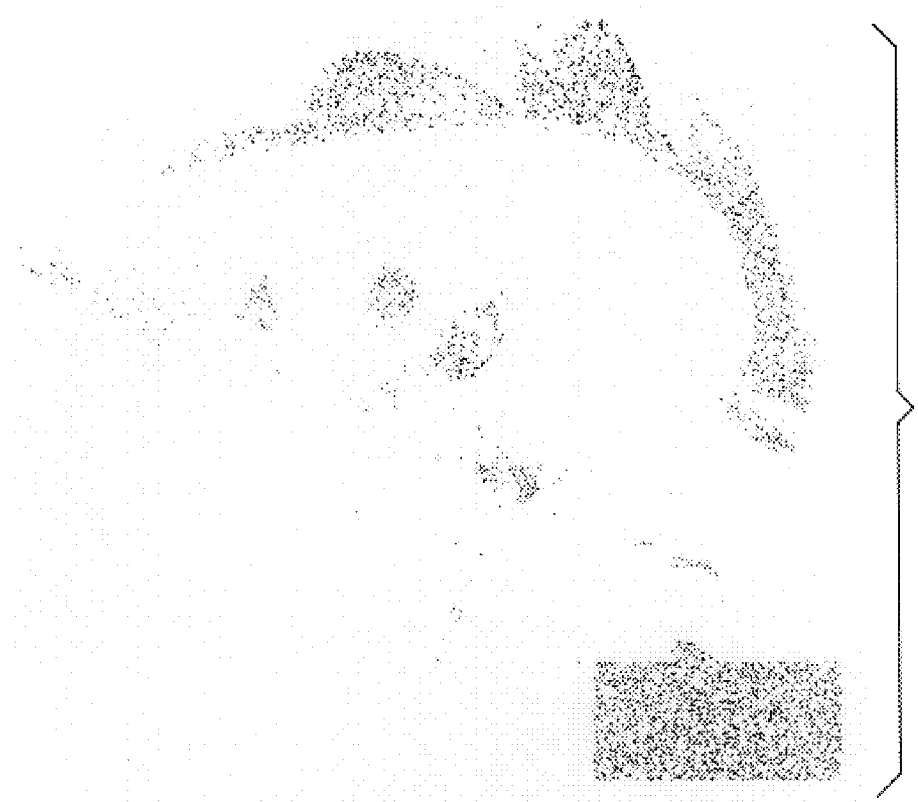
FIG. 10a shows the test digital image "component" generated with the dispersed dot screen compensated according to the compensation curve of FIG. 8b.
Figure 10B:
FIG. 10b shows the test digital image "component" generated with the cluster dot screen compensated according to the compensation curve of FIG. 8c.

The halftone gray level data in the image is converted into two screened binary images. The first screen (front) 23 dispersed dot image component is illustrated in FIG. 10a, while the second screen (back) 25 cluster dot image component is illustrated in FIG. 10b. These images (FIGS. 10a, 10b) were generated according to the respective compensation curves 29, 31 of FIGS. 8b and 8c.

Figure 8D:
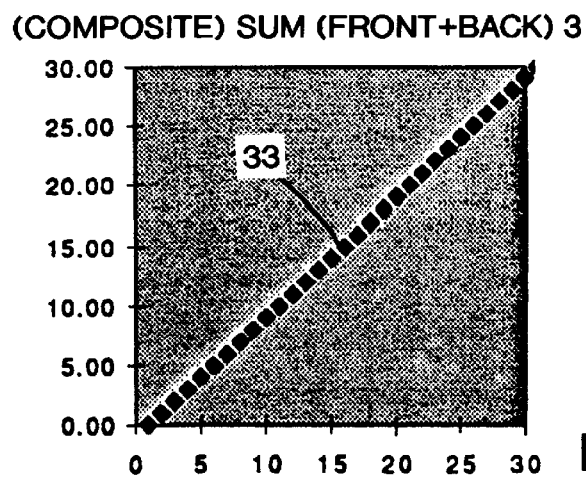
FIG. 8d shows a plot of the resultant output curve, i.e. for the composite (third) screen pattern, over the same range of gray scale values as FIGS. 8b and 8c.
Figure 11:
FIG. 11 shows the composite test digital image generated with the composite compensation curve of FIG. 8d.

The output, composite is shown in FIG. 11 and was generated in accord with the composite curve 33 values of FIG. 8d.

The binary combination of the output composite curve is implemented in a pixel calculation which is the result of a multiplication process. If 0 equals printing value, and 1 equals non printing value, the pixel calculations follow the protocol:

| first screen image | | second screen image | | third/output |
|---|---|---|---|---|
| "0" | × | "0" | = | "0" |
| "0" | × | "1" | = | "0" |
| "1" | × | "0" | = | "0" |
| "1" | × | "0" | = | "1" |

Figure 12:
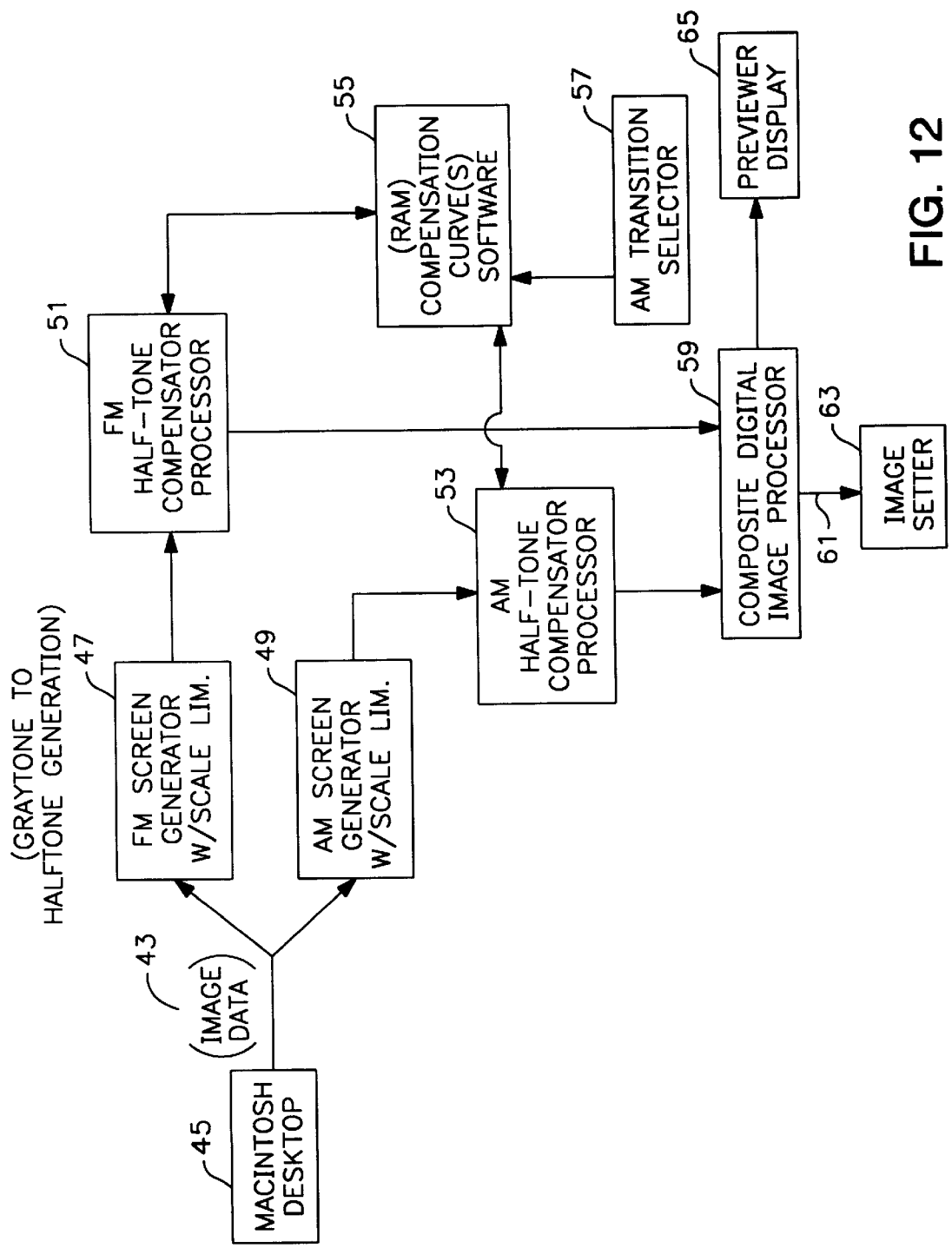
FIG. 12 shows a block diagram for structure used to implement the processes of the present invention.

The method, i.e., the process of the algorithms can be carried out with any number of different structures. One such structure is illustrated in FIG. 12. Gray tone image data 43, FIG. 12, is received from a desktop publish computer such as a Macintosh Quatro 800 computer 45. This image data 43 is simultaneously fed to an FM screen generator circuit 47 and an AM screen generator circuit 49. Each of these generators ate implemented by small programmed microprocessors with dispersed dot screening pattern data (circuit 47) and cluster dot screening pattern data (circuit 49) respectively. Included are the gray scale level limitations for the first and second screens 23, 25.

The output from the FM screen generator circuit 47 is connected to a first halftone compensator processor 51 which generates the curves 29 and 37 of FIGS. 8b and 9b, respectively. The output from the AM screen generator circuit 49 is connected to a second halftone compensator processor 53 which generates the curves 31 and 39 of FIGS. 8c and 9c, respectively. The first and second compensator processors 51, 53 each have access to the software held in a random access memory (RAM) 55, which holds the code shown in TABLE A, or other such computer software code. A transition step selector 57, connected to the RAM 55, can adjust the software steps for generating the off-set 35, and can select from among a number of preselected transition value sizes.

A composite digital image processor 59, receives data being the halftone values of the component curves and generates the image output 61 to an image setter 63. A previewer display 65 is connected to the composite digital image processor 59 to view the output image available to the image setter 63.

Figure 13:
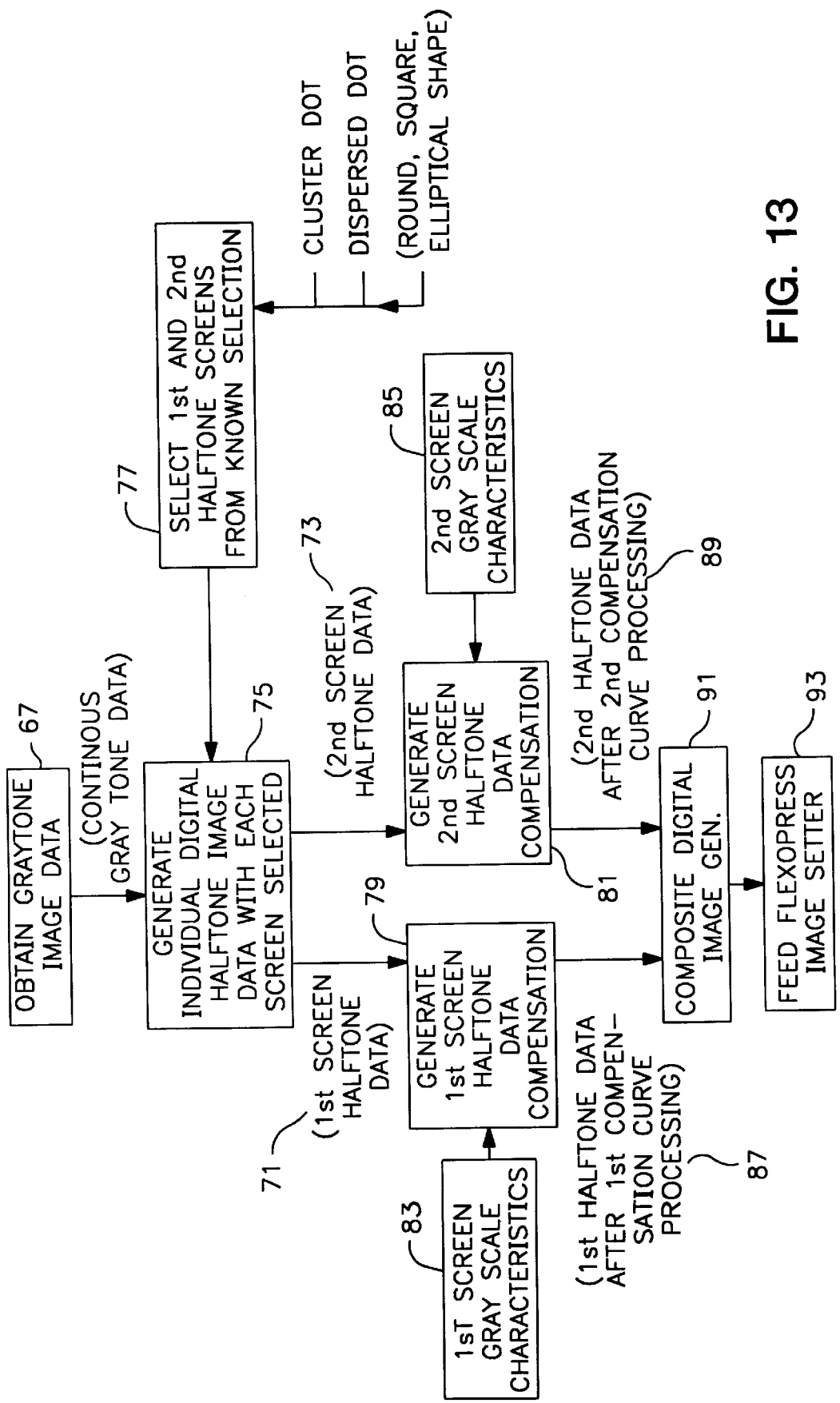
FIG. 13 shows a block diagram for the processing steps of generating a composite digital image with compensated halftone data.

The structure shown in FIG. 12 can be programmed into a large computer system. When such implementation is used, the large computer system operates as shown in the flow chart, FIG. 13. Continuous gray tone image data is obtained 67. From this image data 69, first halftone screen data 71, and second halftone screen data 73 are digitally generated 75 utilizing a first and a second dot screens selected.

The first 71 and second 73 halftone screen data is operated upon by the generation 79, 81, of respective compensation curves and the generation therewith of respective first 87 and second 89 screen compensated data (87 and 89, respectively). This generation 79 and 81 is function, as discussed above, of the first screen and second screen gray scale characteristics for the particular printer (83, 85). A digital image composite is generated 91 from the first and second compensated halftone image data 83, 85 and provided 93 to an image setter or printer.

Figure 14:
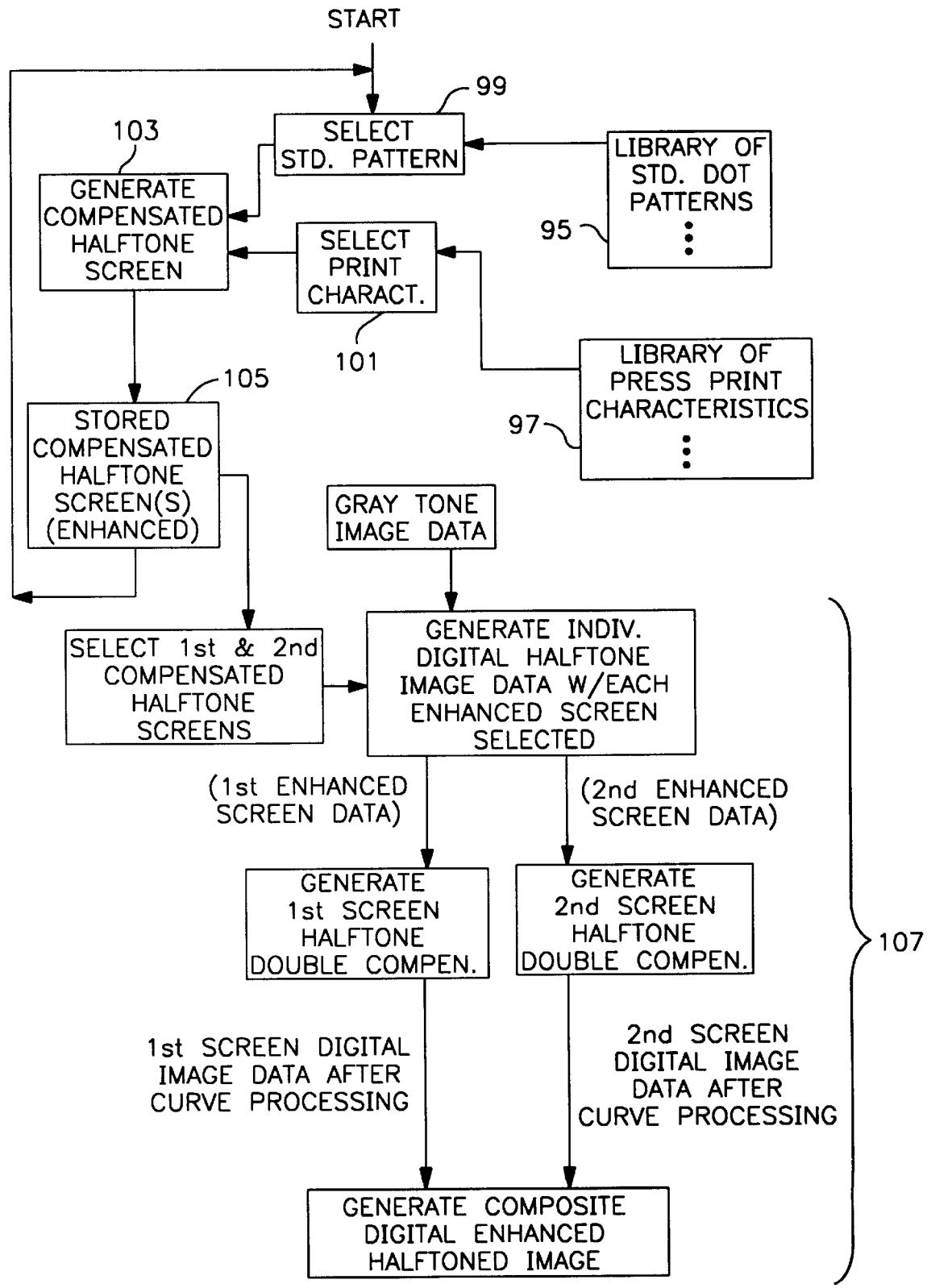
FIG. 14 shows a block diagram for building a library of enhanced dot screens from compensated halftone screens and using same to generate composite enhanced digital images.

This process can be taken a step further with the generation of a library of enhanced halftone screens, FIG. 14. The process of generating enhance digital images from halftone screened images is repeated for generating new halftone screens from existing screens. Then gray tone image data is processed in the same manner to generate composite digital enhanced halftone image data. A library of dot screens 95 and a library of press print characteristics 97 are assembled. Selections are made 99, 101 from each library. A compensated halftone screen is generated 103 for each selection. This process includes the steps 75, 79, 81, 83, 85, and 91 shown in FIG. 13, and a described above in connection with FIGS. 8a–8d, and 10a–11.

A library of enhanced halftone screens created by prior compensation processing can be stored 105 for in a higher level digital halftone processing 107.

Many changes can be made in the above-described invention without departing from the intent and scope thereof. It is thereby intended that the above description be read in the illustrative sense and not in the limiting sense. Substitutions can be made in the depth and dimensions stated above and for the wear and other tolerances rendered thereby.

TABLE A

```
Function FrontScreenValue (FrontStartPoint, FrontTransitionStep, FrontMinimumDot, FrontFirstDot, Fron
tEndPoint, BackStartPoint, Xin)
    If Xin > FrontFirstDot Then
        FrontScreenValue = FrontMinimumDot
    End If
    If Xin >= FrontFirstDot And Xin < BackStartPoint Then
        FrontScreenValue = Xin
    End If
    If Xin >= BackStartPoint And Xin < FrontEndPoint Then
        Yc = BackStartPoint - FrontTransitionStep
        Xc = BackStartPoint
        Yd = FrontFirstDot
        Xd = FronyEndPoint
        Slope = (Yc - Yd)/(Xc - Xd)
        FrontScreenValue = Yc + Slope * (Xin - Xc)
    End If
End Function
Function BackScreenValue (BackStart Point, BackTransitionStep, BackMinimumDot, BackFirstDot, BackEndPo
int, FrontEndPoint, Xin)
    If Xin <= BackStartPoint Then
        BackScreenValue = BackMinimumDot
    End If
    If Xin > BackStartPoint And Xin < FrontEndPoint Then
```

TABLE A-continued

```
        Ye = BackFirstDot
        Xe = BackStartPoint
        Yf = FrontEndPoint - BackTransitionStep
        Xf = FrontEndPoint
        Slope = (Ye - Yf)/(Xe - Xf)
        BackScreenValue = Ye + Slope * (Xin - Xe)
    End If
    If Xin >= FrontEndPoint Then
        BackScreenValue = Xin
    End If
End Function
```

What is claimed is:

1. A method of digital halftone imaging for generating an improved digital image output from a gray tone image received from an image source, comprising the steps of:

generating a first image component from the gray scale image received, by using a first dispersed dot screening pattern, said first image component being a first halftone component screen with superior optical quality in a first lower gray scale range;

generating a second image component from the same gray scale image received, by using a second cluster dot screening pattern, said second image component being a second halftone component screen with superior optical quality in a second higher gray scale range;

limiting said first and second image components from respective gray scale values of unacceptable optical quality; and combining said first and second image components to produce an output image over the entire gray scale, where the value of each component at each gray level is compensated thereby limiting the composite combination to the original gray tone value received at each point.

2. The method of claim 1 wherein said combining step generates a composite combination where the first dispersed dot screen solely contributes to the output image at a first lower gray scale region and the second cluster dot screen solely contributes to the output image at the second higher gray scale region; and wherein the combining step establishes a transition region from the first to second screens, where said transition is gradual over a range of gray values.

3. The method of claim 2 wherein the combining step of composite combination includes creating said first and second screened image components according to respective dot assignment curves and combining according to a pixel processing protocol.

4. The method of claim 3 wherein said first dispersed dot screening pattern is an FM dot screen; and wherein said second cluster dot screening pattern is an AM dot screen.

5. The method of claim 4 wherein first image component is generated using said FM dot screen; and wherein said second image component is generated using said AM dot screen.

6. The method of claim 5 wherein said limiting step limits said first FM dispersed dot screen image component values are limited to gray values from 0 to 20; and wherein said second AM cluster dot screen image component values are limited to gray values from 5 to 255.

7. The method of claim 6 wherein the transition region from the first and second screens is the gray scale value region of 5 to 20 where said first FM dispersed dot screen image component values and said second AM cluster dot screen image component values overlap.

8. The method of claim 7 wherein the creating step also including a compensation step which provides a gradual increasing straight line transition of gray levels over said overlap region, and where the respective component values are scaled down to produce a sum output value limited to the original gray tone image.

9. The method of claim 8 wherein the combining step also includes a off-set compensation at a gray scale value of the dispersed dot screen component to minimize flexo highlight break effect at the edge of the second screen.

10. A digital halftoning apparatus for producing enhanced digital imaging using multiple screens within a single image, for receiving gray tone image data from a desktop publishing computer and for providing halftone generated enhanced digital imaging data to an image setter of a flexographic printing system, comprising:

an FM screen generator circuit connectable to said desktop publishing computer and for generating a first image halftone component of said image data, with scale limitation to lower gray scale range;

an AM screen generator circuit connectable to said desktop publishing computer and for generating a second image halftone component of said image data, with scale limitation to higher gray scale range;

a first halftone image data compensator processor connected on the output of said FM screen generator circuit;

a second halftone image data compensator processor connected on the output of said AM screen generator circuit;

a software program memory connected to be accessed by both said FM and AM halftone image data compensator processors, said memory containing software code for directing the operation of respective individual compensation value calculation performed by each individual first and second compensator processors;

a composite digital image processor connected to the outputs of both said first and second compensation value calculation compensator processors; and wherein the output of said composite digital image processor is connectable to the input of a flexopress image setter.

11. A method of generating enhanced halftone screens from existing screens and print performance data comprising the steps of:

selecting a first dot image pattern from a library of existing halftone screens and selecting print performance data factors for said first dot image pattern selected;

selecting a second dot image pattern from a library of existing halftone screens and selecting print performance data factors for said second dot image pattern selected;

generating individual gray scale compensation curves for each of said first and second dot image patterns (screens) selected with the print performance data factors selected;

processing the first selected dot image pattern screen with said first compensation curve generated, and said second dot image pattern screen with said second compensation curve generated to provide compensated first and second halftone screen data; and compositing said compensated first and second halftone screen data to generate an enhanced and compensated halftone screen.

* * * * *